United States Patent
Shribman

(10) Patent No.: US 11,433,447 B2
(45) Date of Patent: Sep. 6, 2022

(54) METHODS FOR SHAPING/WELDING PARTS BY MEANS OF MAGNETIC PULSE

(71) Applicant: ADM28 S.ÀR.L, Luxembourg (LU)

(72) Inventor: Victor Shribman, Kiryat Ono (IL)

(73) Assignee: ADM28 S.ÀR.L, Luxembourg (LU)

( * ) Notice: Subject to any disclaimer, the term of this patent is extended or adjusted under 35 U.S.C. 154(b) by 281 days.

(21) Appl. No.: 16/768,685

(22) PCT Filed: Dec. 3, 2018

(86) PCT No.: PCT/EP2018/083268
§ 371 (c)(1),
(2) Date: May 31, 2020

(87) PCT Pub. No.: WO2019/110466
PCT Pub. Date: Jun. 13, 2019

(65) Prior Publication Data
US 2021/0187580 A1    Jun. 24, 2021

(30) Foreign Application Priority Data
Dec. 8, 2017  (FR) ...................................... 17 61821

(51) Int. Cl.
*B23K 20/00*  (2006.01)
*B21D 26/14*  (2006.01)
(Continued)

(52) U.S. Cl.
CPC ............. *B21D 26/14* (2013.01); *B21D 26/10* (2013.01); *B23K 20/06* (2013.01)

(58) Field of Classification Search
CPC ......... B21D 26/14; B21D 26/10; B23K 20/06
(Continued)

(56) References Cited

U.S. PATENT DOCUMENTS

| | | | | |
|---|---|---|---|---|
| 4,008,117 A | * | 2/1977 | Dybwad | ................ B23K 11/26 219/148 |
| 4,014,729 A | * | 3/1977 | Dybwad | ................ C23C 14/32 156/289 |

(Continued)

FOREIGN PATENT DOCUMENTS

WO    2016/023021 A1    2/2016

OTHER PUBLICATIONS

Woodward, "Springback Calibration of Sheet Metal Components Using Impulse Forming Methods," Thesis, Jan. 1, 2011, pp. 1-68, Ohio State University.

*Primary Examiner* — Kiley S Stoner
(74) *Attorney, Agent, or Firm* — Ipside; C. Andrew Im; Jean-Christophe Hamann

(57) ABSTRACT

A method for shaping a part using a magnetic pulse is provided. A thin conductive layer is positioned on the part. The part is positioned between a coil and a matrix, the conductive layer being arranged between the coil and the part. An induced current, generated by the coil, is configured: to vaporize the conductive layer generating a pressure wave in the direction of the part. Additionally, the induced current is configured to accelerate the part in the direction of the matrix in association with a magnetic field generated by the coil, pressing the part against the matrix, thereby shaping the part. Further, a method for welding a part using a magnetic pulse is provided.

4 Claims, 2 Drawing Sheets

(51) Int. Cl.
*B21D 26/10* (2006.01)
*B23K 20/06* (2006.01)

(58) Field of Classification Search
USPC .................................................. 228/115, 3.1
See application file for complete search history.

(56) References Cited

U.S. PATENT DOCUMENTS

| | | | |
|---|---|---|---|
| 2013/0283878 A1* | 10/2013 | Vivek | B21D 26/021 |
| | | | 72/60 |
| 2016/0001392 A1* | 1/2016 | Bonnen | B23K 20/06 |
| | | | 228/115 |
| 2016/0039041 A1* | 2/2016 | Bonnen | B23K 20/2275 |
| | | | 219/611 |
| 2016/0175980 A1* | 6/2016 | Golovashchenko | B23K 20/22 |
| | | | 228/110.1 |
| 2017/0216959 A1* | 8/2017 | Bruck | B23K 20/165 |
| 2017/0232550 A1* | 8/2017 | Bruck | F01D 5/005 |
| | | | 219/76.12 |
| 2018/0272464 A1* | 9/2018 | Bruck | B33Y 10/00 |
| 2019/0061045 A1* | 2/2019 | Vivek | B32B 3/08 |
| 2019/0202009 A1* | 7/2019 | Bellman | B23K 26/0622 |

\* cited by examiner

METHODS FOR SHAPING/WELDING PARTS BY MEANS OF MAGNETIC PULSE

RELATED APPLICATIONS

This application is a § 371 application of PCT/EP2018/083268 filed Dec. 3, 2018, which claims priority from French Patent Application No. 17 61821 filed Dec. 8, 2017, each of which is incorporated herein by reference in its entirety.

FIELD OF THE INVENTION

The present invention relates to the field of shaping/welding, and more particularly to the field of shaping/welding parts by a magnetic pulse. The present invention is in particular adapted to the shaping/welding of parts having large thicknesses.

BACKGROUND OF THE INVENTION

Known magnetic pulse shaping/welding methods fall within the field of impact shaping/welding methods. These methods allow metal parts to be shaped/welded by means of deformations applied to a metal part by electromagnetic forces generated by a coil.

Conventionally, a device for implementing such magnetic pulse shaping/welding methods includes one or more capacitors connected to a coil to generate a short and intense magnetic field. The one or more capacitors are used to store a large quantity of electrical energy. The intense magnetic field generated is the result of this electrical energy being very quickly discharged into the coil in the form of a very intense variable current in a very short lapse of time. For the purposes of illustration, some devices can reach several hundred thousand amperes in a few microseconds.

The current generates a variable magnetic field between the coil and the part, previously placed in the vicinity thereof, and induces Eddy currents in this part. These Eddy currents associated with the surrounding magnetic field develop forces inside the part which generate a significant acceleration of the part in the direction of either a matrix or of another part.

Depending in particular on the intensity level of the current generated, on the frequency and on the geometrical configuration, the part is either shaped or welded to another part.

However, magnetic pulse shaping/welding methods have the drawback of requiring very high intensities to shape a part or to weld it to another part, which involves the use of a considerable quantity of electrical energy.

The use of high intensities further results in high stresses and temperatures within the coil, which can weaken same and shorten the life thereof, or even lead to irreversible damage to the coil, such as cracks or the melting thereof.

SUMMARY OF THE INVENTION

The present invention aims to overcome the aforementioned drawbacks.

The purpose of the present invention is in particular to provide an effective solution that minimises the electrical energy required to shape/weld a part by means of a magnetic pulse, while guaranteeing a similar outcome and without increasing the implementation cost.

For this purpose, the present invention proposes a method for shaping a part made of a metal material by means of a magnetic pulse.

The part can be a tubular part or even a flat part, however the invention is not limited thereto.

The shaping method includes the steps of:
- positioning a thin layer made of an electrically conducting material, referred to as a conductive layer, on all or part of the part to be shaped,
- positioning the part between a coil and a matrix, the conductive layer being arranged between the coil and the part.

The order in which these steps are implemented is not compulsory and can be amended or take place simultaneously.

A thin layer is understood to mean a layer that has a thickness that lies in the range 0.010 mm to 0.150 mm. The part has a minimum thickness of 1 mm.

The conductive layer has a similar shape to that of the part and a larger dimension so as to be superimposed on the part.

The matrix has an external shape corresponding to the desired final shape of the part, after shaping.

At the end of these steps, the part is placed between the coil and the matrix, and the conductive layer is placed on the part, on the coil side.

The magnetic pulse shaping method then includes generating, by means of the coil, an induced current, said induced current being configured:
- on the one hand to vaporise the conductive layer, generating a pressure wave in the direction of the part, and
- on the other hand, in association with a magnetic field generated by said induction coil, to accelerate the part in the direction of the matrix, via Lorentz forces, pressing said part against the matrix, resulting in the part being shaped.

The shaping method combines two concurrent actions. The pressure wave will push the part in the direction of the matrix. Simultaneously, the Lorentz forces will exert a pressure on the part, accelerating it in the direction of the matrix. The part will be applied tightly against the matrix by the acceleration and deformation of the part towards the matrix, and takes on the shape of the matrix.

Such a magnetic pulse shaping method according to the invention thus has the advantage of requiring less energy than a conventional magnetic pulse shaping method.

Such a shaping method according to the invention thus enables the shaping, using the same starting energy, of parts of greater thicknesses than a conventional magnetic pulse shaping method.

Another advantage lies in the fact that, since less energy is required, the intensity of the current passing within the coil is also lower. The stresses, in terms of plastic deformation and temperatures, to which the coil is subjected, and generated by the passing of very intense current within the coil, are significantly reduced. The life of the coil is thereby significantly increased.

According to specific embodiments, the method according to the invention also has the following features, which are taken individually or in any combination technically possible.

In specific embodiments of the invention, when the part and the conductive layer are made of the same material, the shaping method includes a step of interposing, between the part and the conductive layer, a layer made of an electrically insulating material, referred to as an insulating layer.

This insulating layer advantageously prevents the current passing within the conductive layer and the tubular part from propagating.

The conductive layer has a similar shape to that of the part and a larger dimension so as to be superimposed on the part.

The insulating layer has a thickness that lies in the range 0.1 mm to 0.5 mm, for example in the order of 0.3 mm.

In one example embodiment, the insulating layer is made of a polyimide polymer material (such as Kapton©), an epoxide polymer material ("epoxy") or any other appropriate insulating material known by a person skilled in the art.

The invention further relates to a method for welding two parts, an internal part and an external part, made of a metal material, by means of a magnetic pulse.

The welding method differs from the shaping method in particular as regards the current intensity generated and the frequency used.

The part can be a tubular part or even a flat part, however the invention is not limited thereto.

The welding method includes the steps of:
- positioning the two parts relative to one another,
- positioning a thin layer made of an electrically conducting material, referred to as a conductive layer, on all or part of the external part,
- positioning the parts such that they face a coil, the conductive layer being arranged between said coil and the external part.

The order in which these steps are implemented is not compulsory and can be amended or take place simultaneously.

The internal part is inserted into the external part while forming an overlap area, in which area the welding is to take place. The conductive layer has a similar shape to that of the parts and a dimension that is larger than the external part so as to be superimposed thereon.

At the end of these different steps, the parts are placed in the coil, at the area of superimposition, and the conductive layer is placed on the external part, facing the coil.

The magnetic pulse welding method then includes generating, by means of the coil, an induced current, said induced current being configured:
- on the one hand to vaporise the conductive layer, generating a pressure wave in the direction of the external part, and
- on the other hand, in association with a magnetic field generated by said coil, to accelerate the external part in the direction of the internal part, pressing said external part against said internal part,
- causing the two parts to be welded to one another.

As for the magnetic pulse shaping method, the magnetic pulse welding method combines two concurrent actions. The pressure wave will push the external part in the direction of the internal part. Simultaneously, the Lorentz forces will exert a pressure on the external part, accelerating it in the direction of the internal part. The external part will be applied tightly against the internal part by the acceleration and deformation of the external part towards the internal part and, in some configurations of the angle of impact, comes to be irreversibly welded to the internal part.

The advantages of the magnetic pulse welding method are identical to those described hereinabove for the magnetic pulse shaping method: lower energy, less stressed coil, and welding of parts having greater thicknesses than with a conventional magnetic pulse welding method.

According to specific embodiments, the method according to the invention also has the following features, which are taken individually or in any combination technically possible.

In specific embodiments of the invention, when the part and the conductive layer are made of the same material, the welding method includes a step of interposing, between the part and the conductive layer, a layer made of an electrically insulating material, referred to as an insulating layer.

This insulating layer advantageously prevents the current passing within the conductive layer and the external part from propagating.

The conductive layer has a similar shape to that of the part and a larger dimension so as to be superimposed with the external part.

The insulating layer has, for example, a thickness that lies in the range 0.1 mm to 0.5 mm, for example in the order of 0.3 mm.

In one example embodiment, the insulating layer is made of a polyimide polymer material (such as Kapton©), an epoxide polymer material ("epoxy") or any other appropriate insulating material known by a person skilled in the art.

BRIEF DESCRIPTION OF THE DRAWINGS

The invention will be better understood after reading the following description, which is provided with reference to the accompanying drawings.

DETAILED DESCRIPTION OF THE EMBODIMENTS

In a first alternative embodiment of the invention, the invention is described in detail within the scope of a method for shaping a part by means of a magnetic pulse.

In one non-limiting example embodiment, the shaping method is described relative to the application thereof to the shaping of a tubular part.

A tubular part is understood to mean that the part has the shape of a tube over all or part of the length thereof, at least at an area intended to be shaped.

The tubular part 2, before shaping, preferentially has a circular cross-section.

Although said tubular part 2 is described, and shown, in a detailed manner for the case of a circular cross-section, other cross-section shapes, such as square, rectangular, triangular and oval can apply.

Figure 2:
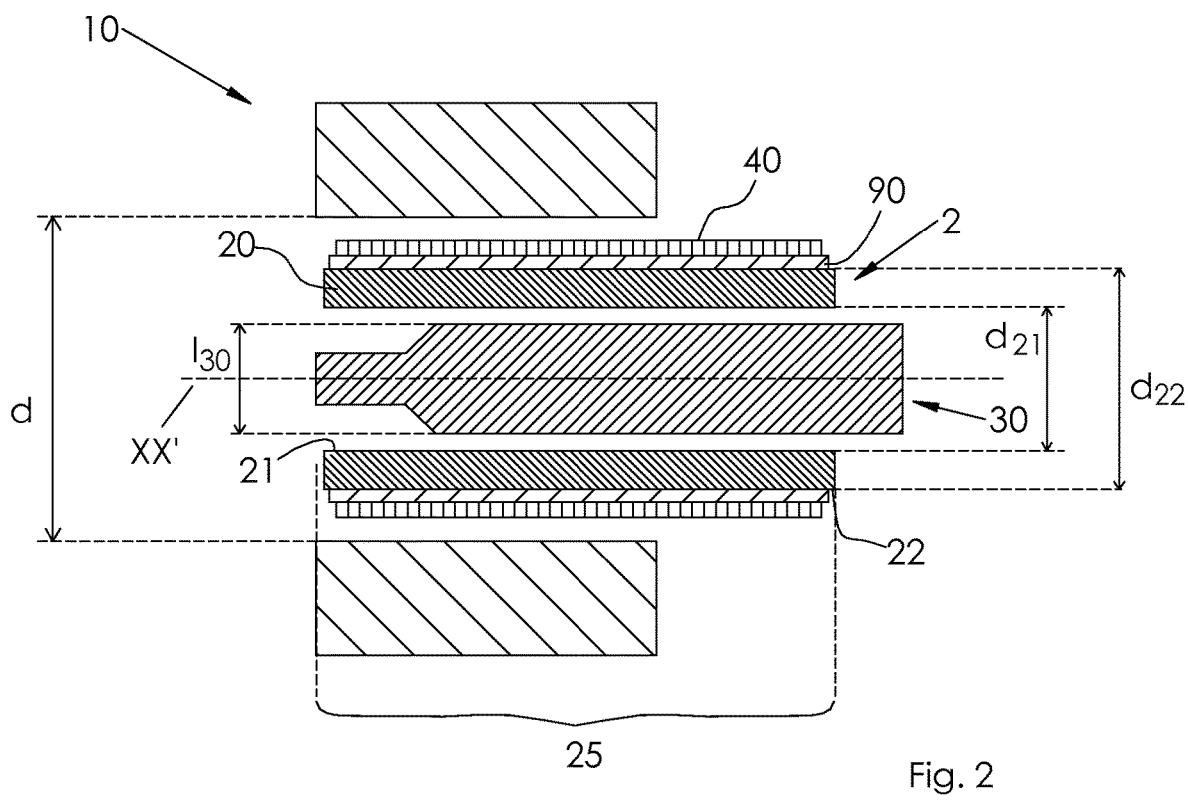
FIG. 2 shows a cross-section of an annular coil of the device in FIG. 1, wherein the part to be shaped, the matrix and the conductive layer are positioned, for the shaping method.

The tubular part 2 includes an annular wall 20 having an inner surface 21 and an outer surface 22, as shown in FIG. 2.

The tubular part 2 has an internal diameter $d_{21}$ and an external diameter $d_{22}$.

The annular wall 20 of the tubular part 2 can have a small thickness or a large thickness.

A small thickness is understood to mean a thickness that lies in the range 1 to 3 mm.

A large thickness is understood to mean a thickness of greater than 3 mm.

The tubular part is preferably made of a metal material.

As a non-limiting example of the invention, the material of the part can be steel or aluminium.

To obtain a part shaped using the shaping method that is the subject of the invention, the component elements of an example device capable of carrying out the shaping method are described hereinabove.

Figure 1:
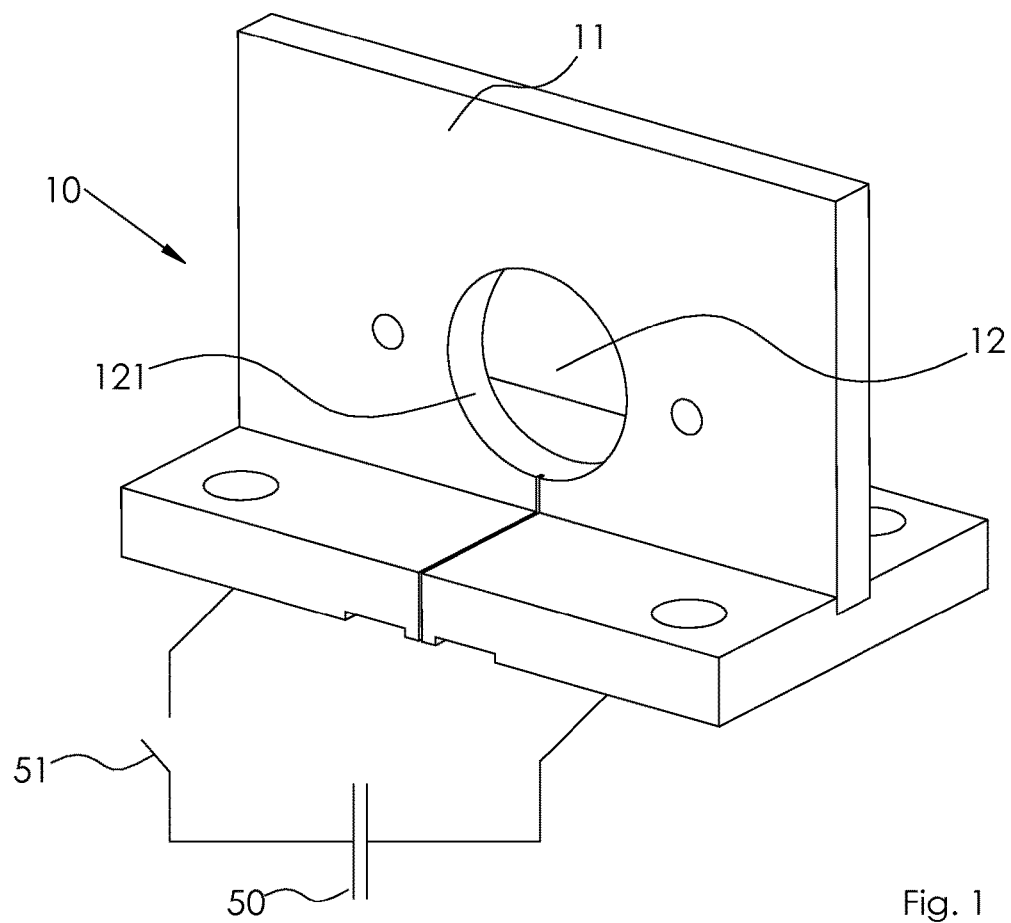
FIG. 1 diagrammatically shows a perspective view of a device adapted to the method for shaping or for welding a tubular part according to the invention.

The device includes a coil 10, a storage unit 50 and one or more switches 51, as shown in FIG. 1. For the shaping method, the device further includes a matrix 30, shown in FIG. 2.

The storage unit 50 is connected to the coil 10 and to the one or more switches 51.

The storage unit 50 is configured such that it stocks a large amount of energy, for example in the order of several tens of kilojoules (kJ).

In one preferred example embodiment, the storage unit 50 is a discharging capacitor bank.

The matrix 30 has an external shape corresponding to the shape that the part to be shaped must take after magnetic pulse deformation.

The matrix 30 is preferentially made of a metal material capable of having a structural strength and of containing the high pressures generated during the magnetic pulse. In one example embodiment, the matrix 30 is made of steel.

The matrix 30 has a maximum cross-section 130 that is greater than the internal diameter $d_{21}$ of the tubular part 2, such that the tubular part 2 can be arranged about the matrix 30, with play.

The coil 10, preferably an annular coil, includes, as shown in FIG. 1, a body 11 in which is made a tubular opening 12 delimited by a so-called peripheral surface 121. Said tubular opening is configured such that it receives the matrix 30 and the tubular part 2, arranged about the matrix, in view of the shaping of said tubular part. In other words, the tubular opening 12 has a circular cross-section, the diameter d whereof is greater than the external diameter $d_{22}$ of the tubular part 2.

The body 11 is made of a material that has specific features, on the one hand in terms of mechanical resistance to plastic deformation so as to cause a high-intensity current to pass therein, in the order of several hundred thousand Amperes, and on the other hand in terms of resistance to high temperatures (i.e. a high melting point) so as not to melt during the shaping method.

In one example embodiment, the material of the body is steel.

The coil is configured such that a high-intensity current can pass therein and generate a magnetic field.

The coil 10 is also configured such that the density of the current in an area of the coil is sufficient to satisfy the shaping conditions. This area is referred to as an active area. In the case of an annular coil such as that described in this embodiment, the current is concentrated, in the active part, on a layer delimited by the peripheral surface 121 facing the outer surface 22 of the tubular part 2 and the thickness whereof corresponds to the skin depth. The current thus generates, in the tubular opening 12, a concentrated magnetic field. In the non-limiting example of a coil 10 made of steel, the skin depth is in the order of several millimetres for a frequency of several tens of kHz.

The shaping method that is the subject of the invention will now be described.

The shaping method comprises a first step of positioning the tubular part 2 relative to the matrix 30.

The tubular part 2 and the matrix 30 are positioned one inside the other. In other words, the tubular part 2 is arranged about the matrix 30, in a coaxial manner, forming, at the overlap thereof, a so-called superimposition area 25, in which area the shaping is to take place.

In the example shown in FIG. 2, the part 2 is engaged inside the matrix 30 such that the superimposition area covers an end segment of the matrix 30.

In a second step, a thin layer made of an electrically conducting material, referred to as a conductive layer 40, is positioned relative to the tubular part 2.

A thin layer is understood to mean a layer that has a thickness that lies in the range 0.010 mm to 0.150 mm.

The conductive layer 40 preferably has a hollow tubular shape.

The conductive layer 40 is placed over all or part of the tubular part 2, at at least one part of the superimposition area 25.

The conductive layer 40 is placed on the outer surface 22 of the tubular part 2.

In one example embodiment, the conductive layer 40 is an aluminium tube.

In a third step, the assembly formed by the tubular part/conductive layer/matrix is positioned facing the coil.

The tubular part/conductive layer/matrix assembly is inserted into the tubular opening 12 of the coil 10.

The tubular part/conductive layer/matrix assembly is advantageously arranged inside the tubular opening 12 such that all or part of the superimposition area 25 is facing the peripheral surface 121 of the coil.

The tubular part 2, the conductive layer 40 and the matrix 30 are held, inside the tubular opening 12, coaxially relative to one another, in an axial direction XX' and relative to the tubular opening 12 of the coil 10 extended in said axial direction XX', by fastening elements (not shown in the figures).

In one example embodiment, the fastening elements are centring spacers and position-holding elements.

The order in which the three previous steps are implemented is not compulsory and, depending on the method, these steps can be carried out in an order that is different to that described or can be carried out simultaneously, without modifying the outcome of said steps.

At the end of these three steps, the tubular part 2 and the conductive layer 40 are positioned, on the one hand relative to one another, and on the other hand between the matrix 30 and the coil 10.

In one specific embodiment of the shaping method, said shaping method can include an additional step of interposing a layer made of an electrically insulating material, referred to as an insulating layer 90, between the tubular part 2 and the conductive layer 40.

This additional step is necessary when the tubular part 2 and the conductive layer 40 are made of the same material.

This insulating layer is intended to prevent the current passing within the conductive layer and the tubular part from propagating.

The insulating layer 90 has a thickness that lies in the range 0.1 mm to 0.5 mm, for example in the order of 0.3 mm.

The insulating layer is interposed between the tubular part and the conductive layer.

The insulating layer 90 preferably takes the shape of a hollow tube.

The insulating layer 90 is placed over all or part of the tubular part 2, at at least one part of the superimposition area 25.

The insulating layer 90 is placed on the outer surface 22 of the tubular part 2.

The shaping method then includes a fourth step, referred to as a step for shaping the tubular part 2 by means of a magnetic pulse.

The storage unit 50 stocks a large amount of energy. When closing the one or more switches 51, the coil 10 is connected to the storage unit. The energy is thus discharged very quickly, in the order of several microseconds, into the coil and a high-intensity current passes into said coil 10.

This current is concentrated, in the active part, over a layer delimited by the peripheral surface 121.

The current generates a variable magnetic field between the coil 10 and the tubular part 2 and induces Eddy currents, commonly referred to as an induced current.

This induced current is concentrated over a reduced thickness, referred to as the skin depth, in the tubular opening.

The skin depth generally lies in the range 0.1 to 1 mm, primarily as a function of the frequency and of the electrical conductivity of the material of the part.

The frequency implemented during the magnetic pulse shaping method is 25 kHz, which corresponds, for example, to a skin depth of 1.4 millimetres for a coil made of a steel material.

Since the conductive layer 40 is the closest to the peripheral surface of the coil, the induced current is firstly transmitted to the conductive layer 40.

Since the conductive layer 40 has a low thickness in front of this skin depth, a part of the induced current is also transmitted to the tubular part 2.

The induced current in the conductive layer will cause said conductive layer to heat up. When the heating energy is greater than the sublimation energy of the conductive layer 40, said conductive layer is vaporised, generating a pressure wave, in particular in the direction of the tubular part 2, pushing said tubular part against the matrix 30.

In parallel, the induced current in the tubular part 2, associated with the surrounding magnetic field, develop high volumetric forces within the part, referred to as Lorentz forces. These Lorentz forces exert a pressure on the tubular part 2, accelerating it in the direction of the matrix.

The impact of the tubular part against the matrix, originating, on the one hand, from the propulsion of the tubular part 2 by the pressure wave and on the other hand from the acceleration of the tubular part by the Lorentz forces, causes said tubular part to undergo immediate and irreversible shaping.

The shaping method according to the invention advantageously makes use of a single energy source, i.e. a capacitor bank discharged into a coil, in order to vaporise the conductive layer and simultaneously apply a magnetic pressure to the tubular part.

The shaping method according to the invention has been described in detail as regards the application thereof for shaping a tubular part.

This method can also apply for shaping a flat part 2b. A flat part is understood to mean that the part has at least one surface that is planar, or substantially planar in shape, over all or part of the length thereof, at least at an area intended to be shaped.

In such a case, the coil is a flat, single- or multi-turn coil, for example in the shape of a lying down E. The conductive layer is a sheet.

Figure 3:
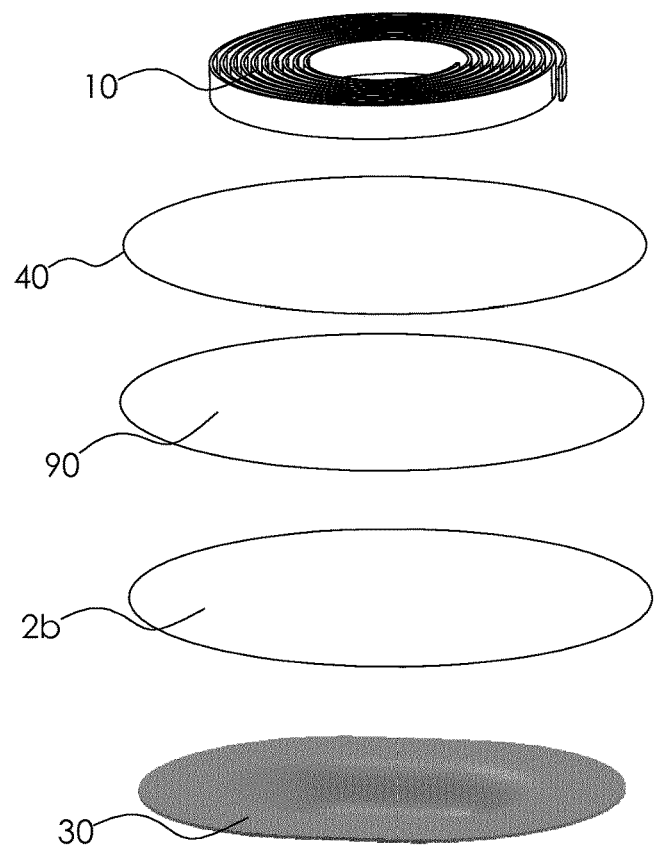
FIG. 3 shows an exploded view of the positioning of the various elements for a method for shaping a flat part according to one example embodiment.

FIG. 3 shows one example of the positioning of the flat part 2b, of the conductive layer 40, and of the insulating layer 90 (where present), relative to the coil 10 and to the matrix 30.

The flat part 2b is positioned on the matrix 30. The insulating layer 90, when necessary, is positioned on all or part of the flat part. The conductive layer 40 is positioned on all or part of the flat part, or of the insulating layer when the latter is necessary.

The matrix, flat part/conductive layer assembly, potentially containing the insulating layer, is positioned facing the coil. The shaping step is identical to that described hereinabove.

In a second alternative embodiment of the invention, the invention is described within the scope of a method for welding two parts by means of a magnetic pulse.

In one non-limiting example embodiment, the welding method is described relative to the application thereof to the welding of two tubular parts.

The device described for the shaping method, with the exception of the matrix, can advantageously be used for the welding method.

The welding method comprises a first step of positioning the two tubular parts relative to one another.

Figure 4:
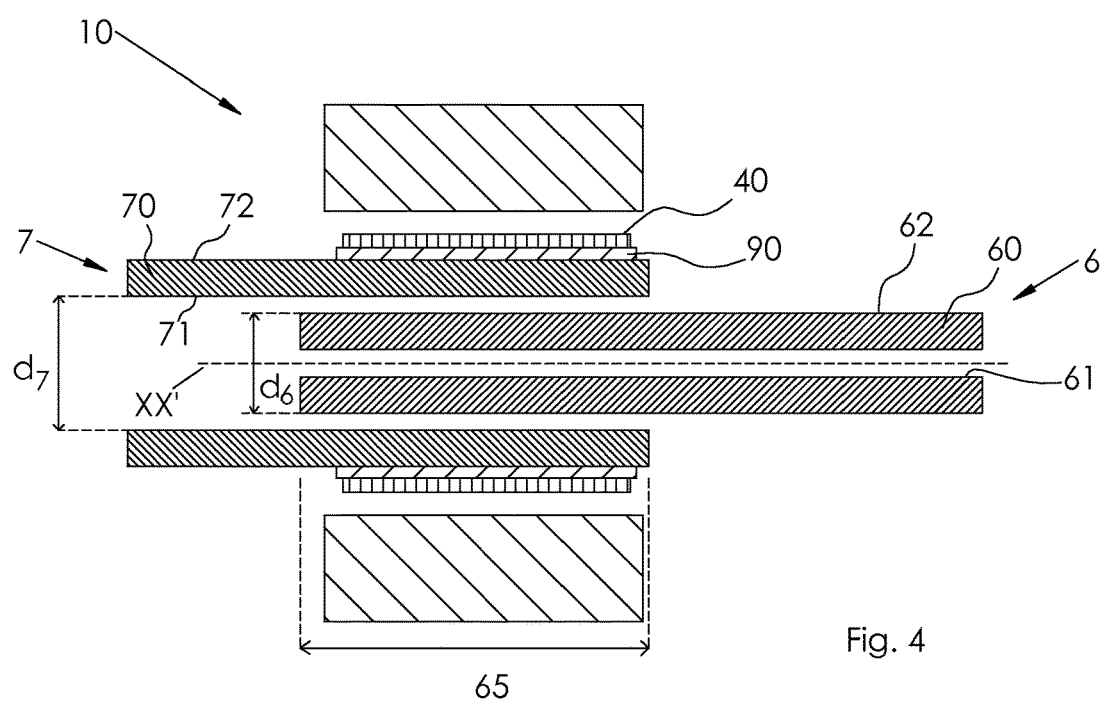
FIG. 4 shows a cross-section of an annular coil of the device in FIG. 1, wherein the two parts and the conductive layer are positioned, for the welding method.

A first tubular part, referred to as an internal part 6, includes an annular wall 60 having an inner surface 61 and an outer surface 62, as shown in FIG. 4.

A second tubular part, referred to as an external part 7, includes an annular wall 70 having an inner surface 71 and an outer surface 72, as shown in FIG. 4.

The external part 7 has an internal diameter $d_7$ that is greater than an external diameter $d_6$ of the internal part.

The internal part 6 and the external part 7 are positioned one inside the other. In other words, the internal part 6 is engaged inside the external part 7, in a coaxial manner, forming, at the superimposition thereof, a so-called overlap area 65.

In a second step, the conductive layer 40 is positioned relative to the two parts 6, 7.

The conductive layer 40 is placed over all or part of the external part 7, at at least one part of the overlap area 65.

The conductive layer 40 is placed on the outer surface 72 of the external part 7.

In a third step, the assembly formed by the internal part/external part/conductive layer is positioned facing the coil.

The internal part/external part/conductive layer assembly is inserted into the tubular opening 12 of the coil 10.

The internal part/external part/conductive layer assembly is advantageously arranged inside the tubular opening 12 such that all or part of the overlap area 65 is facing the peripheral surface 121 of the coil 10.

The internal part 6, the external part 7 and the conductive layer 40 are held, inside the tubular opening 12, coaxially relative to one another, in the axial direction XX' and relative to the tubular opening 12 of the coil 10, extended in said axial direction XX', by the fastening elements (not shown in the figures).

The order in which the three previous steps are implemented is not compulsory and, depending on the method, these steps can be carried out in an order that is different to that described or can be carried out simultaneously, without modifying the outcome of said steps.

At the end of these three steps, the internal part 6, the external part 7 and the conductive layer 40 are positioned relative to one another and inside the coil 10, as shown in FIG. 4.

In one specific embodiment of the welding method, said welding method can include an additional step of interposing the insulating layer 90 between the external part 7 and the conductive layer 40.

As with the shaping method, this additional step is necessary when the tubular part 2 and the conductive layer 40 are made of the same material.

The insulating layer 90 has a thickness that lies in the range 0.1 mm to 0.5 mm, for example in the order of 0.3 mm.

The insulating layer is interposed between the external part 7 and the conductive layer.

The insulating layer 90 preferably takes the shape of a sheet.

The insulating layer 90 is placed over all or part of the external part 7, at at least one part of the superimposition area 25.

The insulating layer 90 is placed on the outer surface 72 of the external part 7.

The welding method then includes a fourth step, referred to as a step for welding the internal part 6 and the external part 7 to one another by means of a magnetic pulse.

The storage unit 50 stocks a large amount of energy. When closing the one or more switches 51, the coil 10 is connected to the storage unit. The energy is thus discharged very quickly, in the order of several microseconds, into the coil and a high-intensity current passes into said coil 10.

This current is concentrated, in the active part, over a layer delimited by the peripheral surface 121.

The current generates a variable magnetic field between the coil 10 and the external part 7 and induces Eddy currents, commonly referred to as an induced current.

As with the shaping method, this induced current is concentrated over a reduced thickness, referred to as the skin depth, in the tubular opening.

The skin depth generally lies in the range 0.1 to 1 mm, primarily as a function of the frequency and of the electrical conductivity of the material of the part.

The frequency implemented during the magnetic pulse shaping method is several tens of kHz, which corresponds, for example, to a skin depth of several millimetres for a coil made of a steel material.

It should be remembered that the intensity level of the current and the frequency implemented differ depending on whether shaping or welding is desired.

Since the conductive layer 40 is the closest to the peripheral surface 121 of the coil 10, the induced current is firstly transmitted to the conductive layer 40.

Since the conductive layer 40 has a low thickness in front of this skin depth, a part of the induced current is also transmitted to the external part 7.

The induced current in the conductive layer will cause said conductive layer to heat up. When the heating energy is greater than the sublimation energy of the conductive layer 40, said conductive layer is vaporised, generating a pressure wave, in particular in the direction of the external part 7, pushing said external part against the internal part 6.

In parallel, the induced current in the external part 7, associated with the surrounding magnetic field, develop high volumetric forces within the external part 7, referred to as Lorentz forces. These Lorentz forces exert a pressure on the external part 7, accelerating it in the direction of the internal part 6.

The impact of the external part against the internal part, originating, on the one hand, from the propulsion of the external part 7 by the pressure wave and on the other hand from the acceleration of the external part 7 by the Lorentz forces, causes the two parts to be immediately welded to one another.

The welding method, as with the shaping method, advantageously makes use of a single energy source, i.e. a capacitor bank discharged into a coil, in order to vaporise the conductive layer and simultaneously apply a magnetic pressure to the external part.

The welding method according to the invention has been described in detail as regards the application thereof for welding a tubular part.

This method can also apply for welding two flat parts to one another.

The description provided hereinabove clearly shows that, via its different features and the advantages thereof, the present invention achieves the objectives set therefore. In particular, it provides a shaping or welding method that uses less energy to shape/weld the same part than a conventional shaping/welding method. In other words, such a shaping/welding method enables the shaping/welding of parts having greater thicknesses using the same energy as for a conventional magnetic pulse shaping/welding method (i.e. without adding a conductive layer).

The invention claimed is:

1. A method for shaping a part made of a metal material using a magnetic pulse, comprising:
    positioning a conductive layer made of an electrically conducting material on all or part of the part to be shaped;
    positioning the part between a coil and a matrix, the conductive layer being arranged between the coil and the part; and
    generating an induced current by the coil, the induced current configured to vaporize the conductive layer generating a pressure wave in a direction of the part, and to accelerate the part in a direction of the matrix, in association with a magnetic field generated by the coil, pressing the part against the matrix, thereby shaping the part.

2. The method according to claim 1, further comprising interposing, between the part and the conductive layer, an insulating layer made of an electrically insulating material.

3. A method for welding two parts made of a metal material using a magnetic pulse, the two parts being an internal part and an external part, comprising:
    positioning the two parts relative to one another;
    positioning a conductive layer made of an electrically conducting material on all or part of the external part;
    positioning the two parts such that they face a coil, the conductive layer being arranged between the coil and the external part;
    generating an induced current by the coil, the induced current being configured:
    generating an induced current by the coil, the induced current configured to vaporize the conductive layer generating a pressure wave in a direction of the external part, and to accelerate the external part in a direction of the internal part, in association with a magnetic field generated by the coil, pressing the external part against the internal part, thereby welding the two parts to one another.

4. The method according to claim 3, further comprising interposing, between the external part and the conductive layer, an insulating layer made of an electrically insulating material.

* * * * *